United States Patent
Decker et al.

(10) Patent No.: US 8,418,760 B2
(45) Date of Patent: Apr. 16, 2013

(54) SAMPLING SYSTEM AND METHOD

(75) Inventors: David L. Decker, Reno, NV (US); Brad F. Lyles, Reno, NV (US); Richard G. Purcell, Reno, NV (US); Ronald Lee Hershey, Reno, NV (US)

(73) Assignee: Board of Regents of the Nevada System of Higher Education, on behalf of the Desert Research Institute, Reno, NV (US)

( * ) Notice: Subject to any disclaimer, the term of this patent is extended or adjusted under 35 U.S.C. 154(b) by 0 days.

(21) Appl. No.: 12/706,670

(22) Filed: Feb. 16, 2010

(65) Prior Publication Data

US 2010/0206564 A1 Aug. 19, 2010

Related U.S. Application Data

(62) Division of application No. 12/706,630, filed on Feb. 16, 2010.

(60) Provisional application No. 61/152,405, filed on Feb. 13, 2009.

(51) Int. Cl.
*E21B 49/08* (2006.01)

(52) U.S. Cl.
USPC ............ 166/264; 137/565.31

(58) Field of Classification Search ............ 166/264, 166/105; 137/565.3, 565.31; 417/205
See application file for complete search history.

(56) References Cited

U.S. PATENT DOCUMENTS

| | | | | |
|---|---|---|---|---|
| 1,980,985 A * | 11/1934 | Deming | | 418/13 |
| 2,022,781 A * | 12/1935 | Pigott | | 166/372 |
| 2,953,156 A * | 9/1960 | Bryant | | 137/263 |
| 3,128,782 A * | 4/1964 | Limpert et al. | | 137/1 |
| 3,292,647 A * | 12/1966 | Scott | | 137/1 |
| 4,295,801 A * | 10/1981 | Bennett | | 417/397 |
| 4,848,471 A * | 7/1989 | Bencze | | 166/335 |
| 5,520,046 A * | 5/1996 | Sornein et al. | | 73/152.23 |
| 5,984,584 A * | 11/1999 | McMillan et al. | | 405/195.1 |
| 6,230,810 B1 * | 5/2001 | Rivas | | 166/357 |
| 6,926,504 B2 * | 8/2005 | Howard | | 417/417 |
| 7,178,512 B1 * | 2/2007 | Merten | | 123/516 |
| 2005/0173107 A1* | 8/2005 | Heilmann et al. | | 166/68 |
| 2006/0162934 A1* | 7/2006 | Shepler | | 166/370 |
| 2010/0206586 A1 | 8/2010 | Decker | | |

OTHER PUBLICATIONS

Dictionary definition of "manifold", accessed Sep. 1, 2011 via thefreedictionary.com.*
Michner, B., Office Action issued Jun. 29, 2011 in pending U.S. Appl. No. 12/706,630.
Nevada Test Site Environmental Report 2007, section 15.2.3, p. 236 of 319 (Sep. 2008).
http://www.bennettsamplepump.com.

* cited by examiner

*Primary Examiner* — David Bagnell
*Assistant Examiner* — Blake Michener
(74) *Attorney, Agent, or Firm* — UNR-DRI Technology Transfer Office; Ryan A. Heck

(57) ABSTRACT

The present disclosure provides an apparatus and method for coupling conduit segments together. A first pump obtains a sample and transmits it through a first conduit to a reservoir accessible by a second pump. The second pump further conducts the sample from the reservoir through a second conduit.

17 Claims, 14 Drawing Sheets

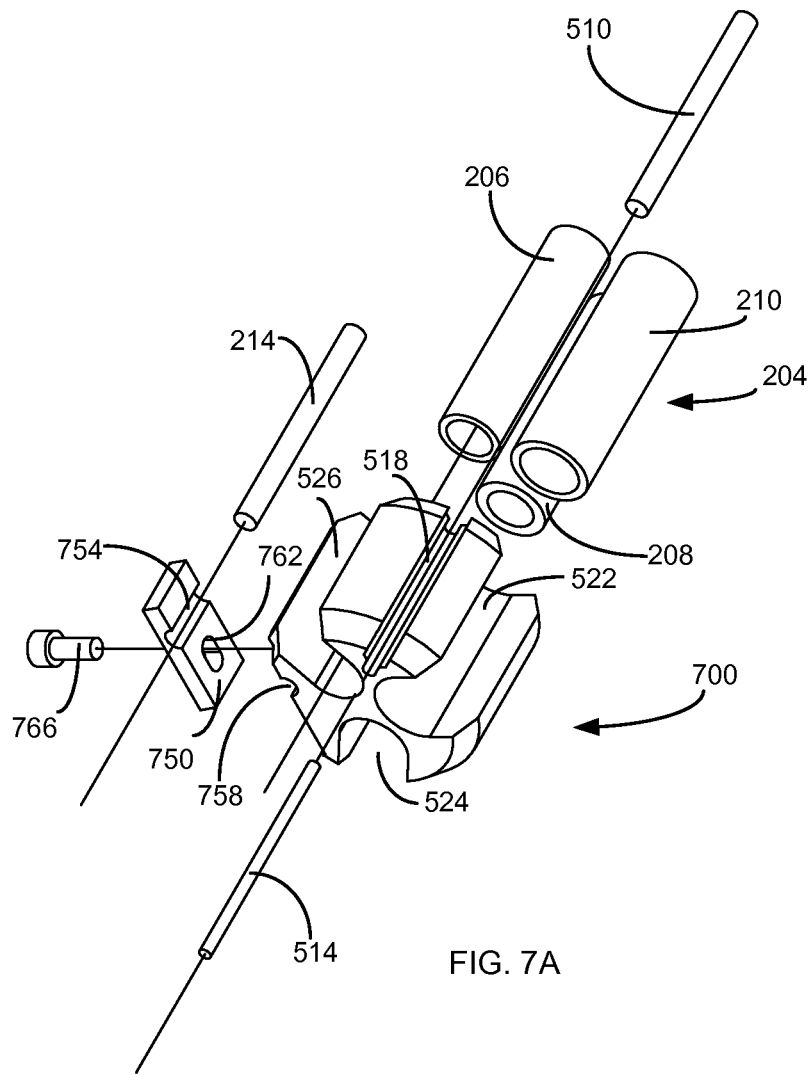
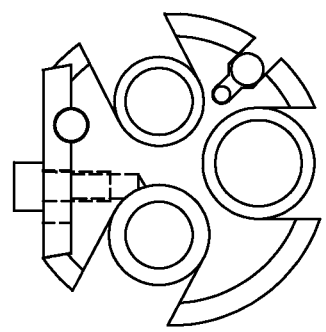
FIG. 7A
FIG. 7B

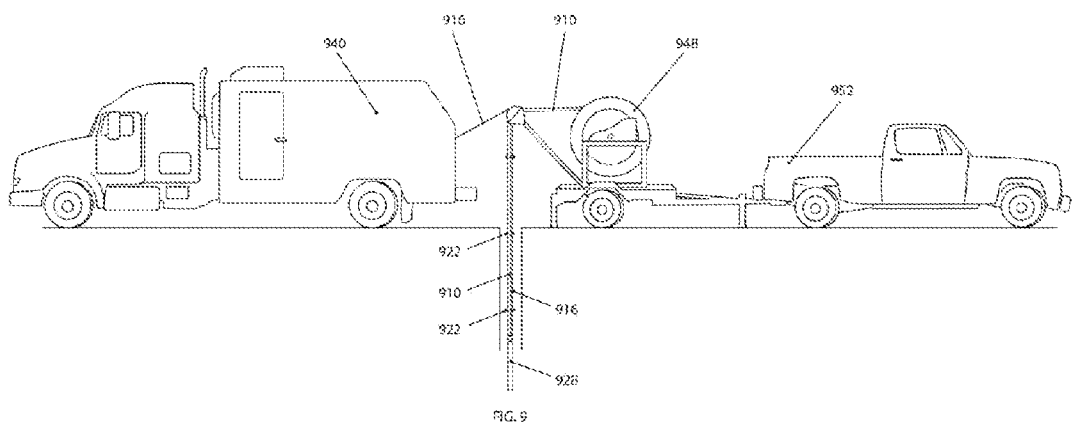

SAMPLING SYSTEM AND METHOD

CROSS REFERENCE TO RELATED APPLICATION

This application is a divisional application of, and incorporates by reference, U.S. patent application Ser. No. 12/706,630, filed Feb. 16, 2010. This application also claims the benefit of U.S. Provisional Application No. 61/152,405, filed Feb. 13, 2009, which is incorporated by reference herein in its entirety.

STATEMENT OF GOVERNMENT SUPPORT

This invention was made with United States Government support under a grant from the Department of Energy, National Nuclear Security Administration, Grant/Contract No. DE-AC08-00NV13609. The United States Government has certain rights in the invention.

FIELD

The present disclosure generally relates to a method and system for obtaining fluid samples or otherwise removing a specified volume of that fluid. In a specific example, the present disclosure provides a clamp that can be used to support a tubing bundle. In another example, the present disclosure provides a staged pump array that can allow samples to be acquired from greater depths than a single pump alone.

BACKGROUND

A number of methods traditionally have been used to obtain fluid samples from various locations, such as environmental testing wells. One method is the Bennett pump, an air driven pump typically used at depths of less than about 800 feet. The existing Bennett pump technology has been used successfully for several years at the Nevada Test Site (NTS) to collect groundwater samples for geochemical analysis. However Bennett pump use has been limited to a subset of the total number of wells that could be sampled, at the NTS, for example, by the operational limitations of the pump.

Bennett Sample Pumps, Inc. previously manufactured a pump that could lift up to 1,600 feet. However, tubing bundles typically experienced significant problems at these deployment depths.

One difficulty experienced in Bennett pump installation in deep boreholes is associated with the mechanical crushing of the tubing bundle as it tracks around a crown pulley at the surface (FIG. 1). The crushing phenomenon is caused by the weight of the tubing bundle, and associated borehole water in the lift tube, being counteracted by a pull force induced by the tubing spooling winch unit. An 800-foot tubing bundle hanging in a borehole has a weight of approximately 170 pounds dry. When all of the tubes are filled with water, the bundle and associated water has a combined weight of approximately 200 pounds. These weights typically scale with increased borehole depth and tubing length. The problem is exacerbated by the bundle design itself.

The tubing bundle typically used with Bennett pumps is assembled by co-wrapping three individual pieces of polypropylene tubing together with a 3/32" aircraft cable and a single, multi-conductor electrical cable. These individual components are brought together from individual material spools to form a bundle on the factory floor, and are then packaged by continuously wrapping with polyvinyl chloride pipe wrap tape before being wound onto a shipping spool. This bundle has an effective diameter of 1.8 inches. Because of this significant diameter, and because of the weight of the bundle hanging in the borehole counteracted by a winch pullout force, the bundle tends to crush, or flatten, as it travels around the crown pulley. The subsequent distortion of the bundle leads to a physical, permanent crushing of individual tubes in the bundle and to delamination of the tape wrap.

Repairs to crushed sections of Bennett tubing bundles are not typically satisfactory because repair hardware results in a localized increase in the Bennett tubing bundle diameter, which can lead to difficulties in the repair traveling through the crown pulley. Recurrent leaks and the associated difficulty in locating leaks under a continuous tape wrap also contribute to the unsuccessful repair and re-use of damaged Bennett tubing bundles. There are reported examples of tubing bundles being crushed beyond repair during the first-use cycle. There is one reported case of the tubing bundle being crushed to such a degree during the initial stages of removal that extreme difficulties were encountered in removing the bundle successfully from the borehole, thereby putting the integrity and long-term accessibility of the borehole at risk.

Additional problems and complications can arise from simply coupling together multiple pumps in an attempt to remove liquid from deeper locations. For example, one prior attempt to couple two Bennet pumps pumped both water and air. The air was produced as a consequence of cavitation.

SUMMARY

In one embodiment, the present disclosure provides a sampling method that includes deploying a tubing bundle, such as from a spool, deploying a wireline proximate the tubing bundle, and coupling the wireline to the tubing bundle. In particular implementations, the wireline and tubing bundle are periodically coupled along their lengths. Coupling the wireline and tubing bundle can support the tubing bundle by transferring bundle weight to the wireline and thereby reduce the chance of the tubing bundle being damaged, particularly during installation and removal.

In some implementations, a clamp is secured around the tubing bundle and secured to the wireline. In some examples, the clamp is prevented from inadvertent loss into the open borehole during installation or removal, such as using a leash to temporarily tie the clamp to a surface-mounted fixture or stationary object. The clamp, in some implementations, is integral with the tubing bundle and securable to the wireline, such as using a fastener. In further implementations, the clamp is external to the tubing bundle and securable to the wireline, such as using a fastener.

Various methods can be used to secure the clamp to the tubing bundle and wireline. In one example, the clamp and wireline are secured by tightening two clamp portions together with a fastener. In another example, the two clamp portions are secure together with a first fastener and the wireline is secured to a clamp portion with a second fastener. In a more specific example, the second fastener is inserted through a shoe clamp that matingly engages the wireline.

The present disclosure also provides a clamp, which may be used in the above-described sampling method. The clamp includes a first clamp portion having an interior portion defining a tubing mounting region. The clamp also includes a second clamp portion having an interior portion defining a tubing mounting region. The second clamp portion also defines a channel adapted to receive a wireline. The first and second clamp portions are configured to surround a tubing section and to be coupled to a wireline located proximate the tubing section.

In some implementations, the first clamp portion also includes a channel for receiving the wireline, which can be designed to mate with the channel of the second clamp portion. The clamp portions can be secured together using various methods, including using a fastener inserted through the apertures formed in the first and second clamp portions. The fastener can also secure the clamp to the wireline. In other implementations, the wireline is secured to the clamp by another method. For example, the clamp can include a shoe clamp that is securable to a clamp portion using a fastener. The wireline may be placed between the shoe clamp and the clamp portion. In some cases, the shoe clamp is located adjacent the channel of the second clamp portion.

Clamps, whether external or integral, can include additional features. For example, one or both of the clamp portions can include a leash mount for receiving a leash, which may be used to further secure the clamp during installation/removal to prevent inadvertent loss into the open borehole.

In yet another implementation the interior portion of the first or second clamp portions are shaped to account for, and securely mount to, tubing having a helical twist. In another implementation, the interior portions of the first or second clamp portions are formed from, or coated with, a resilient material or a gripping material, which can help cushion the tubing bundle in the clamp and reduce slippage.

In yet another implementation, the clamp is located within the tubing bundle, such as by being built into the tubing bundle during tubing assembly. In a specific example, a fixture is placed in the annular space between the tubing pieces and is mechanically coupled to the aircraft cable built into the tubing bundle. A fastener matingly couples the clamp to an external wireline that is co-installed with the tubing bundle. In this example, a very low profile clamping arrangement can result in a negligible increase in the overall tubing bundle diameter.

In various implementations of an integral clamp, a clamp body includes one or more tubing channels located radially about the clamp body. The clamp can also include apertures or channels for additional components, such as a support cable and/or a conductor, such as a multiconductor wire. In one example, a channel is formed in the radial surface of the clamp body for receiving the support cable and conductor. The channel has a first portion having a first width for receiving the support cable and a second portion having a second width for receiving the conductor. The clamp body further defines a channel or aperture for receiving a wireline. In some example, the wireline channel or aperture is formed in the radial surface of the clamp body.

The integral clamp may be secured to the wireline in a number of ways. In one example, a clamp shoe having a wireline channel is secureable to the clamp body using one or more fasteners. In another example, the clamp includes a clamp arm having a curved portion that defines a wireline channel. The clamp arm may be secured to the clamp body using a fastener. In another example, a clamp arm is used that does not include a curved portion, rather being flat, but is tapered so as to encourage engagement of the clamp arm with the wireline. For example, the clamp arm portion having the wireline channel may have a reverse taper and the clamp arm portion receiving the fastener may have a forward taper. In yet another example, the clamp includes a clamp arm having a curved portion defining a wireline channel and a forked end defining a fastener aperture. The clamp arm and clamp body include apertures for receiving a pin. The fastener has a collar defining a channel for receiving the clamp arm. In operation, the pin couples the clamp arm to the clamp body. The forked end of the clamp arm is placed in the channel of the fastener. Moving the fastener out from the clamp body forces the collar against the clamp arm, which pivots about the pin and engages the wireline in the wireline channel of the clamp arm and clamp body.

Another embodiment of the present disclosure provides a sampling method that includes obtaining a fluid sample, transmitting the fluid sample to a staging pump, and pumping the fluid sample with the staging pump to a collection vessel. The assembly can employ a plurality of pumps and/or tubing bundles, such as two, three, four, five, six, or more pumps and/bundles.

In a particular implementation, the fluid sample is transmitted to a reservoir operatively coupled with the staging pump. The reservoir may be formed, for example, by a housing surrounding the staging pump. The reservoir is, in some examples, open to the atmosphere. In other examples, the reservoir is coupled to a gas source for adjusting the level or pressure of gas in the reservoir as the fluid level in the reservoir varies or as the hydraulic pressure in the lower pump changes. Maintaining the hydraulic pressure in a sample during lift through tubing can help prevent dissolved gasses from coming out of solution during transport, which can provide a measurement that more accurately reflects the sample composition at the sampling point. In another implementation, the sample is transmitted to a sample inlet of the staging pump.

In some implementations of the sampling method, the staging pump is coupled to air supply and air exhaust tubes, such as through manifolds coupled to ports on the staging pump.

The staging pump is, in further implementations, coupled to upstream and downstream tubing bundles. A wireline is deployed proximate the tubing bundle. The upstream and downstream tubing bundles are coupled to the wireline. The tubing bundles are, in some examples, coupled to the wireline through one or more clamps, such as a plurality of clamps located periodically along the length of the tubing bundles. The clamps may be designed as described above.

A staging pump assembly, which is useable in the above-described sampling method, is provided in another embodiment of the present disclosure. The staging pump assembly includes a housing, a pump having an air supply inlet, an exhaust air outlet, a sample inlet, and a sample outlet. An air supply manifold is coupled to the air supply inlet of the pump. An exhaust air manifold is coupled to the exhaust air outlet of the pump.

In a more specific implementation, a control valve is coupled to the exhaust air manifold. In another implementation, the control valve is coupled to the air supply manifold. The control valve, which is a solenoid in some specific examples, may be used to control the speed of the pump, such as relative to another pump located further down a tubing bundle. In other example, the control valve is an orifice plate.

In some implementations, the sample inlet is coupled to a reservoir formed by the interior of the housing. In a particular example, the reservoir is open to the atmosphere. According to another example, the reservoir is coupled to a pressure source, such as a gas source, which can be used to adjust the pressure, such as the level of gas in the reservoir, as the reservoir fluid level varies. This arrangement can help prevent sample degassing during transport. In a particular example, the gas source is an inert gas, such as argon. In other embodiments, the sample inlet is coupled to a sample tube, such as through an end cap coupled to the housing.

The staging pump assembly can include additional features. For example, when the assembly is used with a wireline, the housing can include a raceway designed to receive the wireline.

The present disclosure also provides a sample collection system that includes a staging pump assembly, as described above, an upper tubing bundle, a lower tubing bundle, a wireline, and a plurality of clamps coupled to the wireline and the upper tubing bundle. In one configuration, the system also includes a plurality of clamps coupled to the lower tubing bundle and the wireline.

In a particular implementation, the upper and lower tubing bundles each include an air supply tube, an exhaust air tube, and a sample tube. The sample tube of the upper tubing bundle is coupled to the sample outlet of the pump. The air supply tubes, in some examples, are coupled to the air supply manifold. The exhaust air tubes, in further examples, are coupled to the exhaust air manifold. In one example, the sample tube of the lower tubing bundle is coupled to a reservoir formed by the staging pump assembly housing. In another example, the sample tube of the lower tubing bundle is coupled to the sample inlet of the pump.

The exhaust air manifold, in some configurations, is attached to an exhaust bypass tube. In other configurations, the air supply manifold is coupled to an air supply bypass tube.

In one example, an apparatus according to the present disclosure is used to conduct a hydraulic well test. A suitable volume of liquid is removed while monitoring the liquid level as a function of time.

There are additional features and advantages of the various embodiments of the present disclosure. They will become evident as this specification proceeds.

In this regard, it is to be understood that this is a brief summary of the various embodiments described herein. Any given embodiment of the present disclosure need not provide all features noted above, nor must it solve all problems or address all issues in the prior art noted above.

BRIEF DESCRIPTION OF THE DRAWINGS

FIG. 7A is an exploded perspective view, and FIG. 7B is a top plan view, of a clamp according to an embodiment of the present disclosure.

FIG. 9 is a schematic illustration of a method of deploying a tubing bundle and wireline according to an embodiment of the present disclosure.

DETAILED DESCRIPTION

Unless otherwise explained, all technical and scientific terms used herein have the same meaning as commonly understood by one of ordinary skill in the art to which this disclosure belongs. In case of conflict, the present specification, including explanations of terms, will control. The singular terms "a," "an," and "the" include plural referents unless context clearly indicates otherwise. Similarly, the word "or" is intended to include "and" unless the context clearly indicates otherwise. The term "comprising" means "including;" hence, "comprising A or B" means including A or B, as well as A and B together.

Figure 1:
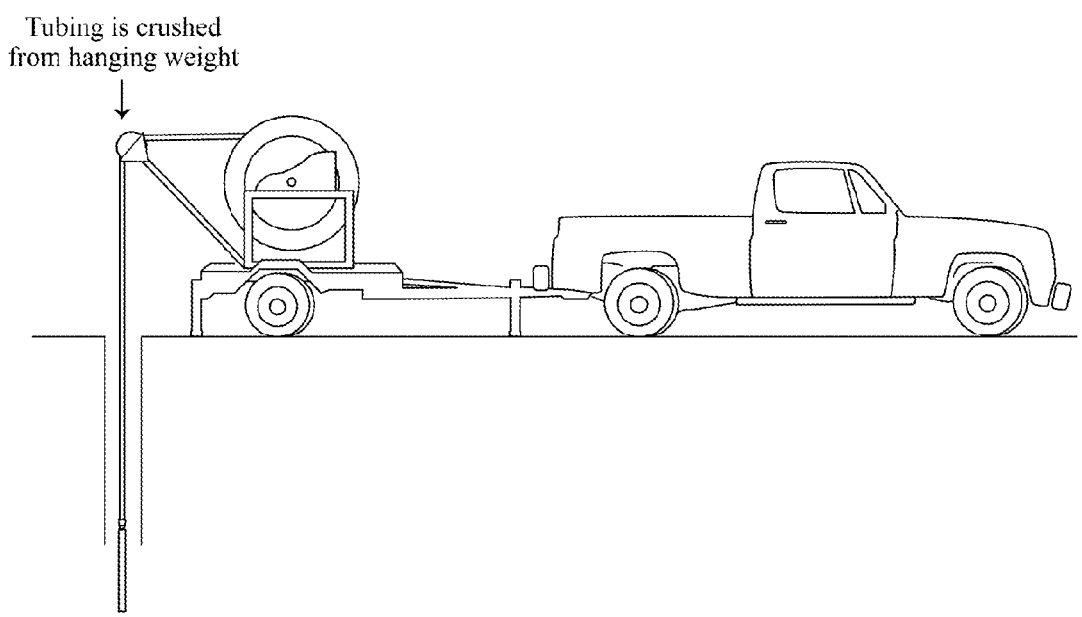
FIG. 1 is a schematic illustration of a prior art method of deploying a tubing bundle.
Figure 2:
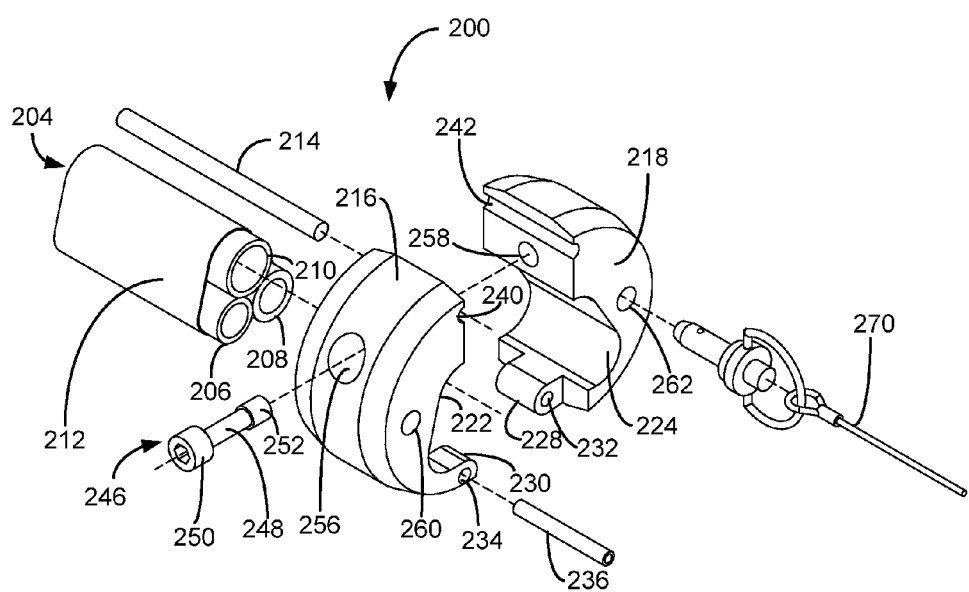
FIG. 2 is an exploded perspective view of a clamp according to an embodiment of the present disclosure.

FIG. 2 illustrates an embodiment 200 of a clamp according to the present disclosure. The clamp 200 is designed to secure a section of a tubing bundle 204. The tubing bundle 204, in a specific example, is a Bennett tubing bundle, such as for use with a Bennett pump. Suitable pumps and tubing bundles are available from Bennett Sample Pumps, Inc., of Amarillo, Tex. Bennett tubing bundles typically include three tubes, 206, 208, 210, which can be used for admission of air to the pump, exhausting of air out of the pump and the borehole, and for pumped liquid conveyance. The tubing may be used for other purposes, and the tubing bundle may be of a different type than Bennett tubing. The tubing bundle, in some examples, includes more or less than the three tubes shown in FIG. 2.

As shown in FIG. 2, the tubing bundle 204 is surrounded by a sheath 212, which may be a wrap of polyvinylchloride film, for example. In other cases, ties, such as nylon wire ties, are used to hold the tubes 206, 208, 210 in the bundle 204. In further implementations, the sheath is omitted. In yet further implementations, the sheath is a bonded rubber or plastic material. The tubing, in another configuration, is concentrically nested inside one another, with various sheaths as previously described.

The tubing bundle 204 can contain additional components. For example, the tubing bundle 204 can include a metal cable (not shown), such as a stainless steel cable, in some implementations. In a particular example, the metal cable is located in the interior of the tubing bundle 204. The metal cable can be used to help provide rigidity to the tubing bundle 204. In another implementation, the tubing bundle 204 includes one or more additional wires or cables that may be used, in some examples, to supply power to components used with the tubing bundle 204, such as pumps or meters, or to transmit data to or from components used with the tubing bundle 204.

The clamp 200 includes a first portion 216 and a second portion 218. The first and second portions 216, 218 are generally semicircular. Thus, when the clamp 204 is in use, it has a generally circular cross section. Each portion 216, 218 includes mounting sections 222, 224. Mounting sections 222, 224 are shaped and dimensioned to engage the tubing bundle 204. Accordingly, the mounting sections 222, 224 may have different shapes or dimensions, depending on the nature of the tubing bundle 204 with which the clamp 200 will be used. Although the first and second portions 216, 218 are shown as semicircular, they may have other geometric shapes. For example, in some cases the clamp 200, when in use, may have an oval, rectangular, or square cross section. Circular cross sections may be beneficial when the clamp 200 is to be used in a well, as wells are typically bored with a generally circular cross section.

The first and second portions 216, 218, in some implementations, have axial faces terminating in a geometry that minimizes the chances of the clamp 200 catching on protrusions encountered in the operating environment. For example, the portions 216, 218 may have a right-circular cone geometry.

The clamp 200 may be constructed from any suitable materials, which are typically chosen to withstand the environment in which the clamp 200 will be used. For example, at least a portion of the clamp 200 may be constructed from metals or metal alloys, such as stainless steel. Portions of the clamp 200 may also be constructed from polymeric materials, such as silicone or polyurethane. Portions of the clamp may also be constructed from elastomers, such as latex. When less rigid materials are used, such as polymeric materials, for the construction of the clamp portions 216, 218, exterior portions or interior portions thereof may be bonded to a protective shell, such as a metallic coating, for example, a stainless steel shell.

In some embodiments, the first or second portions 216, 218, particularly the mounting sections 222, 224, may be coated with a material to aid in gripping the tubing bundle or cushioning the interaction of the clamp 200 and the tubing bundle 204 to prevent damage to the tubing bundle 204. The material may be for, example, a polymeric material, particularly elastomers, such as latex. The material may also be a polyurethane or silicone material. In other implementations, such as when the first and second portions 216, 218 are formed primarily from a polymeric material, the mounting sections 222, 224 are coated with a more rigid material, for example, a metal or metal alloy. In a specific example, the mounting sections 222, 224 are made of stainless steel and mounted to a less rigid material.

In further embodiments, the mounting sections 222, 224, or a coating thereon, are formed in a pattern or texture that aids in gripping the tubing bundle. For example, the mounting sections 222, 224 may have a ribbed surface. In another embodiment, the mounting section 222, 224 are shaped to accommodate the shape and geometry of the tubing bundle. For example, in use, the tubing bundle 204 may have a helical twist. The mounting sections 222, 224 can be manufactured with a mating helical structure.

The first and second portions 216, 218 of the clamp 200 are held together by a hinge formed from a tab 228 on the second portion 218 and a slot formed by arms 230 (the other arm is not visible in FIG. 2) on the first portion 216. The tab 228 and arms 230 have bores 232, 234 through which a pin 236 can be inserted to secure the hinge joint together. In some cases, the tab 228 or arms 230 are threaded (not shown) and the pin 236 is secured through mating threads (not shown). In other embodiments, the hinge joint is secured through other means, such as a retaining device, such as a cotter pin, inserted through an aperture in the pin 236. However, the present disclosure is not limited to the use of a hinge to secure portions 216, 218, which may be secured together in any suitable manner.

The clamp 200 is typically used in conjunction with an external wireline 214. In some examples, the wireline serves simply as a mechanical support. In other examples, the wireline may serve additional purposes. For example, in specific examples, the wireline is a multiconductor geophysical logging wireline. A multiconductor wireline may be used, for example, for operating a pressure transducer, which can be used to log hydraulic stage during an aquifer test. The muliticonductor wireline can also be used for making time-series measurements of fluid chemistry during a field-scale tracer test or purging. The multiconductor wireline may also be used to operate a radiation sensor, such as a tritium detector.

The clamp 200 may be secured to the wireline. First and second portions 216, 218 include grooves 240, 242 for receiving the wireline. The grooves 240, 242 can be tightened against the wireline using retention bolt 246. Retention bolt 246 includes central shaft 248 and first and second ends 250, 252, which typically have a larger diameter than the central shaft 248. The retention bolt 246 is inserted through apertures 256, 258 in the first and second portions 216, 218, respectively. In some embodiments, the aperture 258 in the second portion 218 of the clamp 200 is threaded and can be secured through mating threads in the aperture 258. In at least some embodiments, the diameter of the second end 252 is larger than the aperture 256. In this way, the retaining bolt 246 is kept with the first portion 216. In particular embodiments, the second end 252 includes a trapped nut. Securing the retaining bolt 246 can avoid potential problems from the bolt 246 being lost, such as in a sample well, which could damage the well or other components used in the well. In other embodiments, a different component is used to tighten the portions 216, 218 to the wireline, such as a bolt other than a retention bolt, for example, when component loss into the operating environment is less of a concern.

The clamp 200 includes apertures 260, 262 for receiving a retaining device (not shown). The retaining device can be useful, for example, for securing the clamp 200 to a fixed object at the wellhead. Securing the clamp 200 to a fixed object can have benefits such as securing the clamp portions 216, 218, preventing them from being lost in the event the clamp 200 disengages from the wireline or tubing bundle 204 during the installation or removal procedure. Suitable retaining device include Kwik-Lok pins and lanyards, available from Jergens, Inc. of Cleveland, Ohio. The apertures 260, 262 can include indentions for receiving a portion of the retaining device, such as spring loaded radially extending pins. The apertures 260, 262 may be located elsewhere on the clamp 200, such as on the opposite axial face of the clamp 200 or on the radial surface of the clamp 200. In further embodiments, one or both of the apertures 260, 262 are omitted, as the clamp 200 is not limited to use with a retaining device, or the clamp 200 includes additional aperture for receiving retaining devices, including multiple such apertures on a single clamp portion 216, 218.

Figure 3:
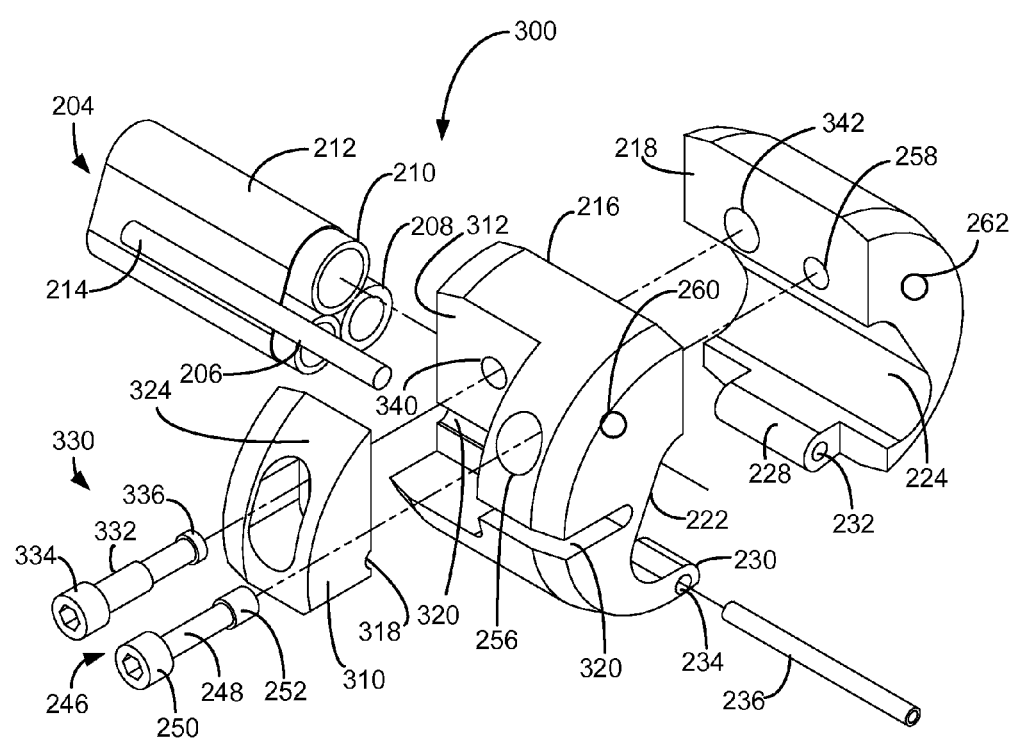
FIG. 3 is an exploded perspective view of a clamp according to an embodiment of the present disclosure.

FIG. 3 presents an alternative design of a clamp 300 according to the present disclosure. Certain components are analogous to those in the clamp 200 of FIG. 2 are correspondingly labeled, and not further discussed. The clamp 300 differs from clamp 200 in that, in addition to the two clamp portions 216, 288, the clamp 300 includes a clamping shoe 310. The clamping shoe 310 may be used, for example, to secure the clamp 300 to the wireline 214.

As shown in FIG. 3, the clamping shoe 310 is generally wedge shaped and configured to mate with a notch 312 of the first clamp portion 216. A portion of the face of the clamping shoe 310 that engages the notch 312 includes a channel 318. The first clamp portion 316 includes a matching channel 320. The channels 318 and 310 receive the wireline 214. The clamp shoe 310 defines an aperture 324.

The clamp 300 is secured to the wireline 214 by clamp shoe bolt 330. Clamp shoe bolt 330 has a central shaft 332 and first and second ends 334, 336, which typically have a larger diameter than the central shaft 332. The clamp shoe bolt 246 is inserted through aperture 324 of the clamp shoe 310, aperture 340 of the first clamp portion 216, and aperture 342 of the second clamp portion 218. In some embodiments, the aperture 342 in the second portion 218 of the clamp 300 is threaded and can be secured through mating threads in the bolt 330. In at least some embodiments, the diameter of the second end 336 is larger than the diameter of the aperture 320. In this way, the clamp shoe bolt 330 is kept with the clamp shoe 310. In particular embodiments, the second end 336 includes a trapped nut. Securing the clamp shoe bolt 330 can avoid potential problems from the bolt 330 being lost, such as in a sample well, which could damage the well or other components used in the well. Tightening the clamp shoe bolt 330 engages the clamp shoe 310 and the first clamp portion 216 with the wireline 214. In other embodiments, a different component is used to secure the clamp shoe 310 to the clamp 300, or to tighten the clamp shoe 310 and the first clamp portion 216 to the wireline 214, such as a bolt without a retention means, such as when component loss into the operating environment is less of a concern.

Figure 4:
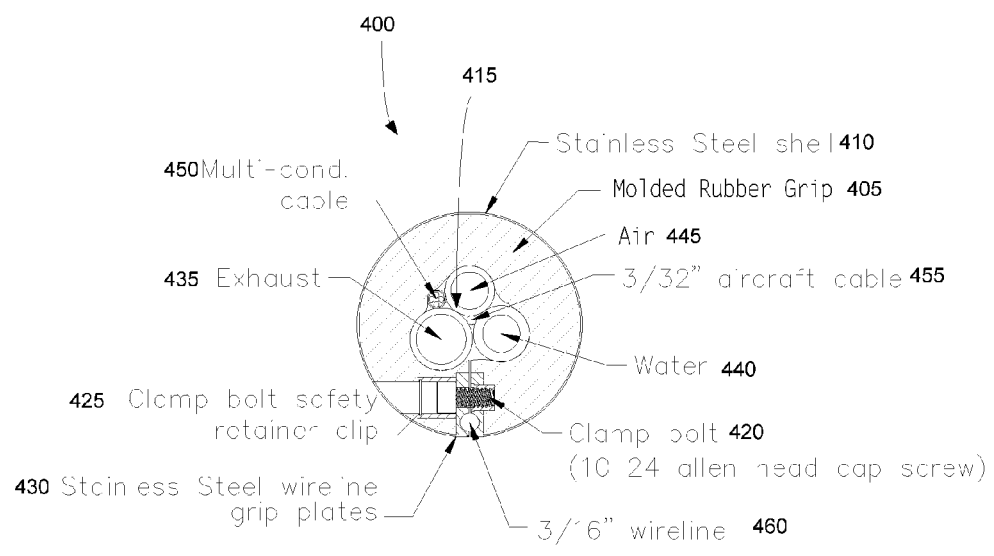
FIG. 4 is a cross sectional view of a clamp according to an embodiment of the present disclosure.

FIG. 4 illustrates a cross sectional view of another embodiment of a clamp 400 according to the present disclosure. The clamp 400 includes a molded elastomer center 405, such as molded rubber, surrounded by a rigid shell 410. In a specific example, the shell 410 is made of stainless steel. The clamp 400 is secured around a tubing bundle 415 using a fastener 420. The fastener 420, in one example, has a retaining clip 425 to help secure the fastener 420 to the clamp 400. The clamp 400 also includes stainless steel grip plates 430, which surround an aperture for receiving a wireline.

The clamp 400 is shown in use with a tubing bundle that includes an air exhaust tube 435, a sample tube 440, and an air supply tube 445. The tubing bundle also includes a multi-conductor cable 450 and a support cable 455. The clamp 400 is shown coupled to an external wireline 460.

Figure 5:
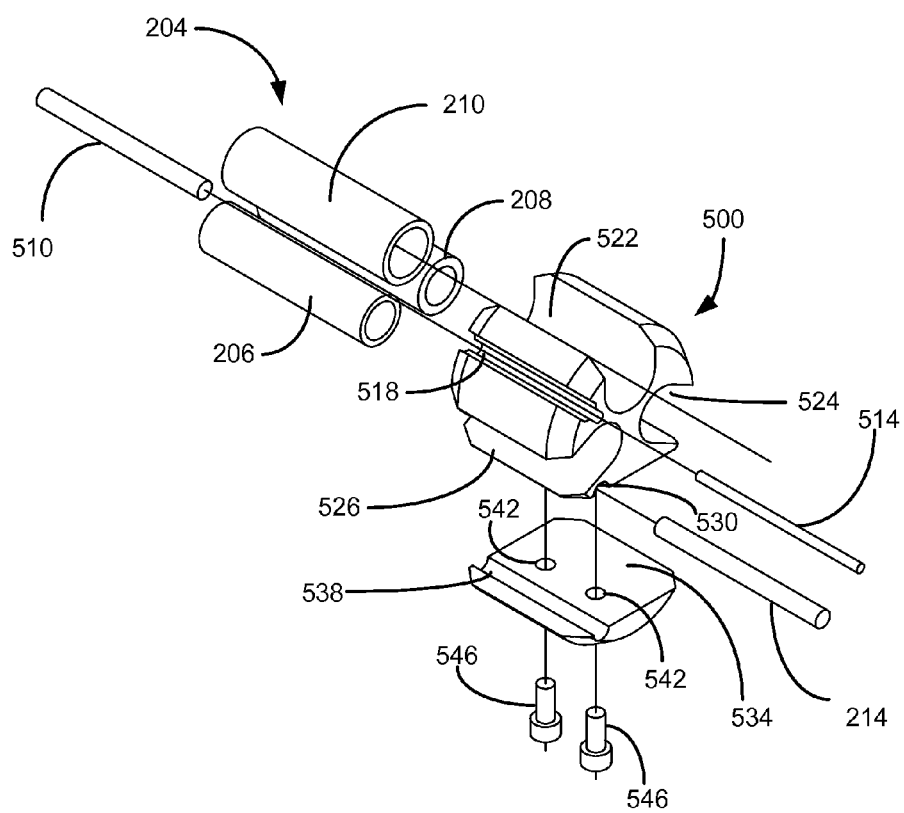
FIG. 5 is an exploded perspective view of a clamp according to an embodiment of the present disclosure.

FIG. 5 is an exploded perspective view of another clamp embodiment 500 of the present disclosure. While the clamps 200, 300, and 400 are designed to secure a tubing bundle from the outside, clamp 500 is adapted to secure tubing bundle 204, having tubes 206, 208, and 210, from the interior of the tubing bundle. As shown, the tubing bundle 204 includes an inner support cable 514. A conductor 510, such a multiconductor wire, is used with the tubing bundle 204. The clamp 500 defines an aperture 518 or grove in the outer surface of the clamp 500 for receiving the inner support cable 514 and the conductor 510. The inner support cable 514 is matingly secured to the clamp 500 by means of a ferrule or other such arrangement to lock the cable 514 into the aperture 518.

The outer surface of the clamp 500 also defines apertures or groves 522, 524, 526 for receiving tubes 206, 208, and 210. An aperture or groove 530 for receiving the wireline 214 is also defined in the outer surface of the clamp 500. The wireline 214 can be secured in the aperture 530, and to the clamp 500, using a clamp shoe 534. The clamp shoe 534 has a mating groove or aperture 538 for receiving the wireline 214. The clamp shoe 534 defines apertures 542 through which fasteners 546, such as bolts, can be used to securingly engage the clamp shoe 534 against the clamp 500.

In some examples, the clamp 500 is inserted into the tubing bundle 204 during manufacturing. In other examples, the clamp 500 is spliced into the tubing bundle 204 after manufacturing. Compared with some clamp designs which secure the tubing bundle 204 from the outside, clamp 500 secures the tubing bundle 204 from the inside. This arrangement can allow the clamped tubing bundle to have a reduced diameter, which can be useful in smaller diameter wells/boreholes.

Figure 6:
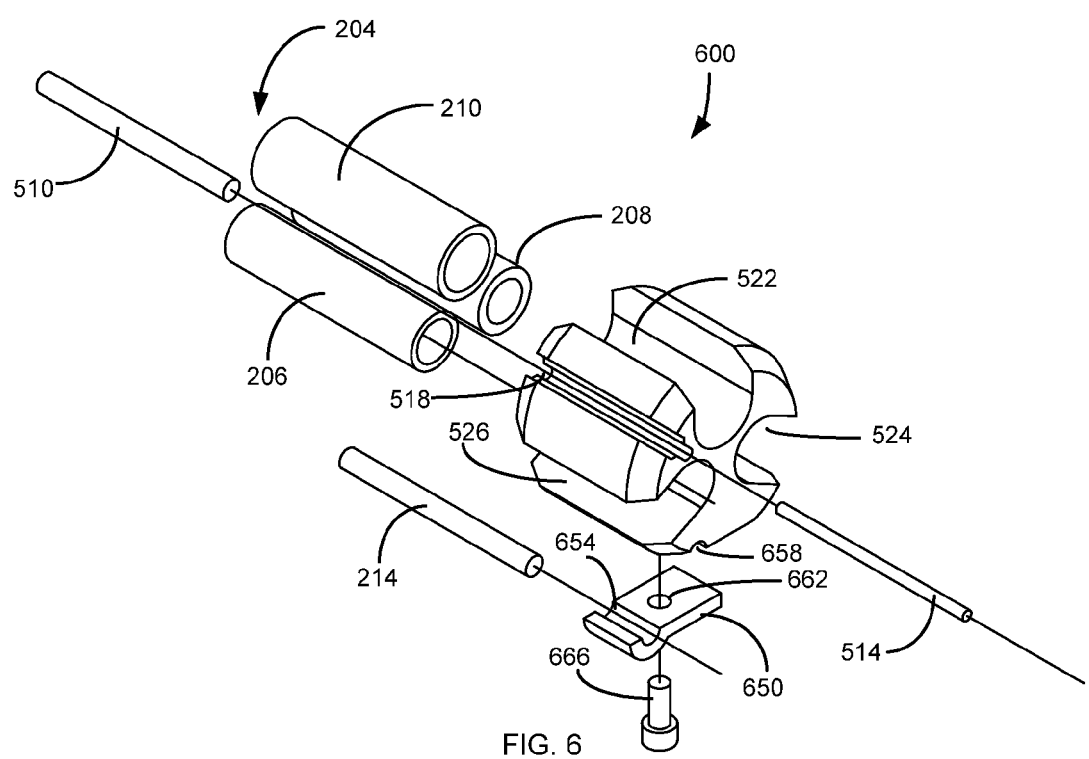
FIG. 6 is an exploded perspective view of a clamp according to an embodiment of the present disclosure.

FIG. 6 illustrates an embodiment of a clamp 600 that is somewhat similar to the clamp 500 of FIG. 5 and analogous components are labeled as in FIG. 6. The clamp 600 includes a somewhat different mechanism for securing the clamp 600 to the wireline 214. The clamp 600 includes a clamp arm 650. The clamp arm 650 has a curved portion 654 that defines a channel for receiving the wireline 214. The clamp 600 defines a channel 658 that also receives the wireline 214. A flat portion of the clamp arm 650 defines an aperture 662 that receives a fastener 666 that can be secured to the clamp 600. In a specific example, fastener 666 is a caged bolt. The clamp 600 allows the wireline 214 to be secured/removed without completely removing the clamp arm 650 from the clamp 600.

FIG. 7A illustrates another clamp design, 700, that is similar to the clamp 600 of FIG. 6. Clamp 700 includes a clamp arm 750 having a portion 754 that defines a channel for receiving the wireline 214. Unlike the clamp arm 650, the clamp arm 750 is not curved, and so can mount flatter to the clamp 700, as shown in FIG. 7B. The clamp 700 defines a channel 758 that, together with the channel in the portion 754, receives the wireline 214 and secures it to the clamp 700. The clamp arm 750 defines an aperture 762 through which a fastener 766, which is a caged bolt in some examples, may be inserted to secure the clamp arm 750 to the clamp 700.

In a particular implementation, both edges of the clamp arm 750 incorporate a tapered, wedge shape. The end of the clamp arm 750 that includes that channel 754 has a reverse taper and forces the clamp arm 750 into the wireline 214. The side of the clamp arm 750 that includes the aperture 762 includes a forward taper, forcing the clamp arm 750 sideways toward the wireline 214, allowing the reverse taper to work. This design can allow the clamp 700 to be secured to the wireline 214 tightening the fastener 766 as in other designs.

Figure 8A:
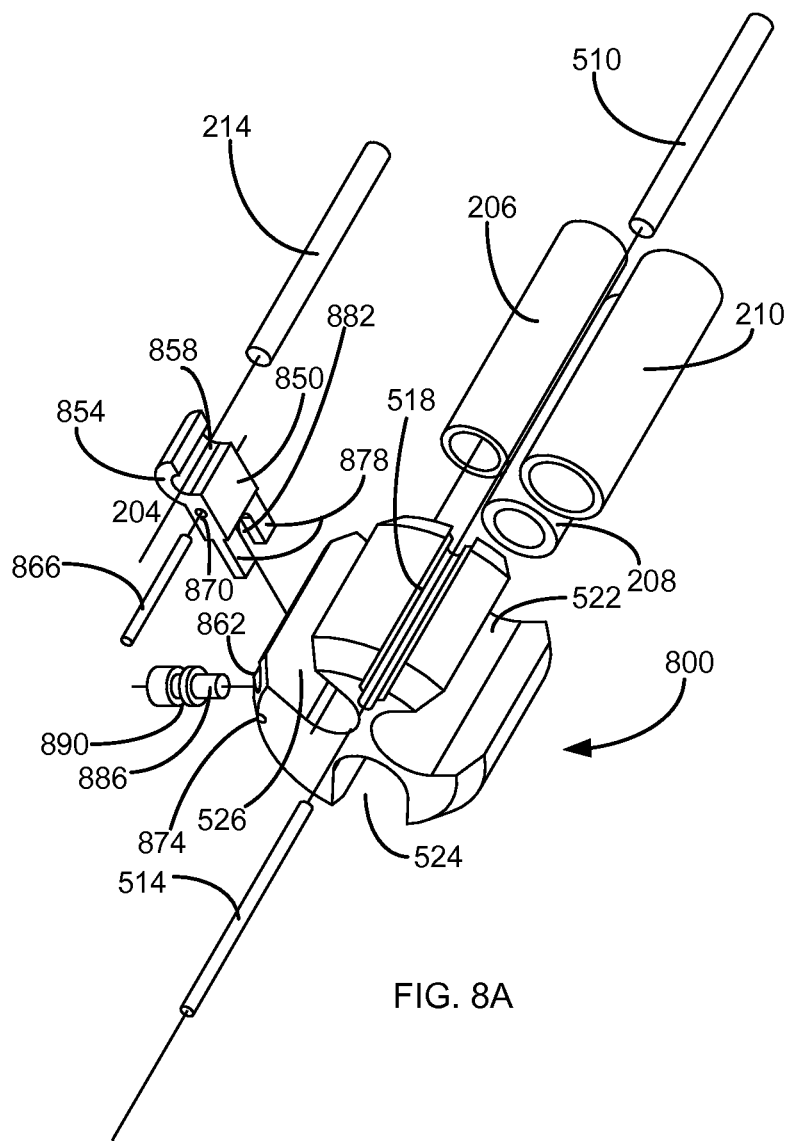
FIG. 8A is an exploded perspective view.

FIG. 8A illustrates a further design for a clamp 800. The clamp 800 includes a clamp lever arm 850. The clamp lever arm 850 includes a curved portion 854 that defines a channel 858 for receiving the wireline 214. The clamp 800 also defines a channel 862 for receiving the wireline 214.

A pin 866 is insertable through an aperture 870 in the clamp arm 850. The clamp 800 also includes an aperture 874 for receiving the pin 866. The portion of the clamp arm 850 at the opposite end as the curved portion 854 includes fork arms 878 that define an opening 882. A fastener 886, having a collar that defines a channel 890, is insertable through the opening 882 and retainably received by the clamp 800.

Figure 8B:
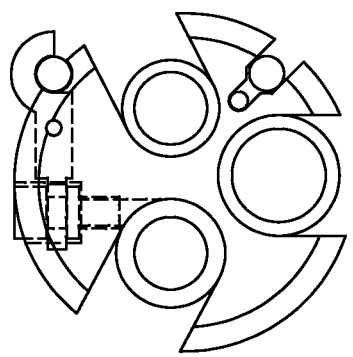
FIG. 8B is a top plan view, of a clamp according to an embodiment of the present disclosure.

In operation, loosening the fastener 886 pushes the ridges of the channel 890 against the pin 866, thus forcing the clamp arm 850 against the clamp 800, securing the wireline 214 in the channels 858, 862. This arrangement is shown in FIG. 8B.

FIG. 9 is a schematic diagram illustrating how the clamps 200-800 of FIGS. 2-8 may be used. These designs can be used to reduce or eliminate tubing bundle failures associated with prior installation techniques. For example, the setup shown in FIG. 9 can reduce or eliminate the tubing bundle 910 as a mechanical support component of the tubing-pump bundle, and transfer these load-carrying responsibilities to a separately controlled wireline 916. Mechanical contact is made between the tubing bundle 910 and the wireline 916 at a suitable number of points to provide the desired level of mechanical support. Mechanical contact is accomplished using a clamp 922, which in some embodiments, is the clamp 200 of FIG. 2, the clamp 300 of FIG. 3, or the clamp 400 of FIG. 4. In a particular implementation, a clamp 922 is secured to the wireline 916 approximately every 50 feet. Through the use of the clamp 922, the weight of the tubing 910, pump(s) 928, and any material contained within the tubing bundle 910, such as sample water, is transferred to, and supported by, the wireline 916. As a result, the tubing bundle 910 is less likely to experience the forces encountered during prior installation techniques, and will therefore be less likely to be subjected to forces that lead to crushing of the tubing bundle 910.

In a particular implementation, the setup includes a separate wireline winch 934 and operator, which may be located on a wireline truck 940. The wireline 910, in some examples, is a simple load-bearing cable. In other examples, the wireline is a multi-conductor geophysical logging wireline. The multi-conductor wireline can be used, for example, to operate a pressure transducer, such as for logging hydraulic stage during an aquifer test, or for making time-series measurements of borehole fluid chemistry, such as during a field-scale tracer test or purging, or for other borehole measurements with suitable sensors, devices, or tools that are attached to the wireline.

As shown in FIG. 9, the tubing bundle 910 is coupled to a spool 948 on a tubing truck 952.

In some embodiments, a clamp according to the present disclosure is coupled to a tubing bundle during the manufacturing process or prior to loading the tubing bundle for installation, such as prior to winding the tubing on a spool. In other embodiments, a clamp according to the present disclosure is coupled to the tubing bundle while the tubing bundle is being deployed or installed.

Figure 10:
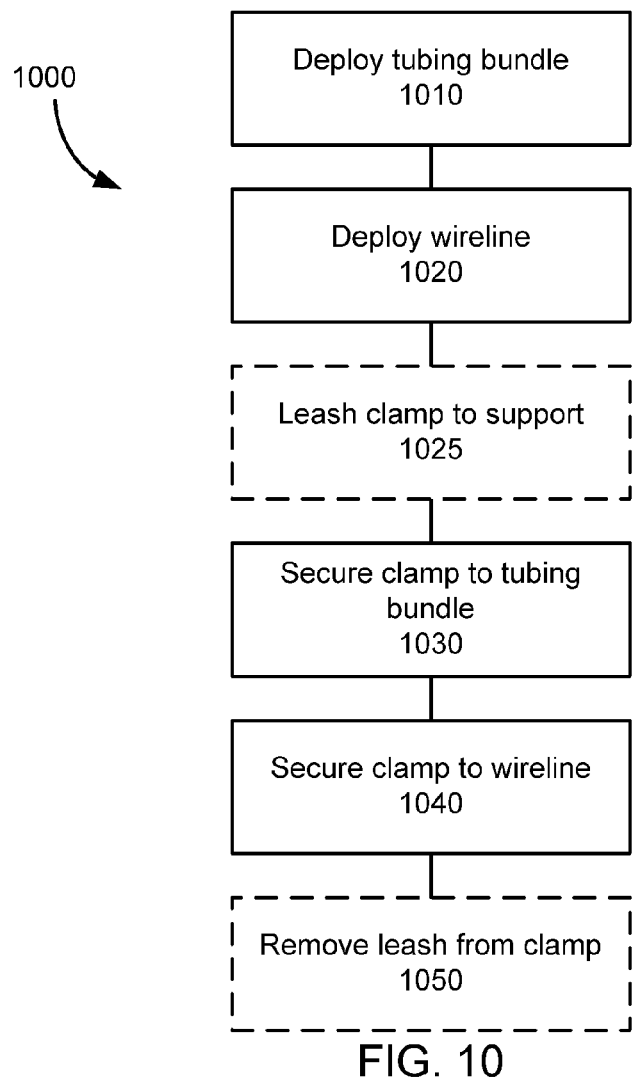
FIG. 10 is a flowchart of a method of deploying a tubing bundle and wireline according to an embodiment of the present disclosure.

FIG. 10 illustrates a flowchart of a method 1000 of using the disclosed clamping device with a tubing bundle and wireline. In step 1010, a tubing bundle is deployed, such as from the spool 948 of FIG. 9. In step 1020, a wireline is deployed, such as from the wireline truck 940 of FIG. 9. In a specific example, steps 1010 and 1020 are performed simultaneously such that the wireline and the tubing bundle are deployed at the same rate.

In step 1025 a clamp is attached to a retaining device, or leash, one end of which is secured to a non-moving object outside of the well casing. In particular examples, step 1025 is carried out by slipping a lanyard to a fixed object outside the borehole and inserting a pin into the apertures 260, 262 of the clamps 200, 300 of FIGS. 2 and 3, respectively. The leash is a flexible cable that does not hinder personnel manipulation of the clamp, but is strong enough to prevent loss of the clamp into the well in the event that it is dropped by the operator in the process of attempting to secure the tubing bundle and the wireline with the clamp in steps 1030 and 1040.

In step 1030, a clamp is secured to the tubing bundle. Securing the clamp to the tubing bundle may include the steps of placing clamp portions around the tubing bundle and securing the clamp portions together, such as by inserting a hinge pin through the clamp portions. Step 1030 can also include the step of securing the clamp portions together using a fastener, such as a bolt.

In step 1040, the clamp is secured to the wireline. In particular implementations of the method 1000, steps 1030 and 1040 occur concurrently. For example, when the clamp 200 of FIG. 2 is used, securing the clamp portions together with a bolt secures the clamp portions together and engages the clamp with the wireline. In other implementations, step 1040 is a discrete action. For example, when the clamp 300 of FIG. 3 is used, step 1040 can include tightening the clamp shoe bolt 330 to secure the clamp shoe 310 to the first clamp portion 216.

In step 1050 the retaining device, or leash, is removed from the clamp.

Once the tubing bundle is no longer needed, it can be removed from its operating environment by performing the steps of method 1000 in reverse order.

Staging Pump Assembly

Figure 11:
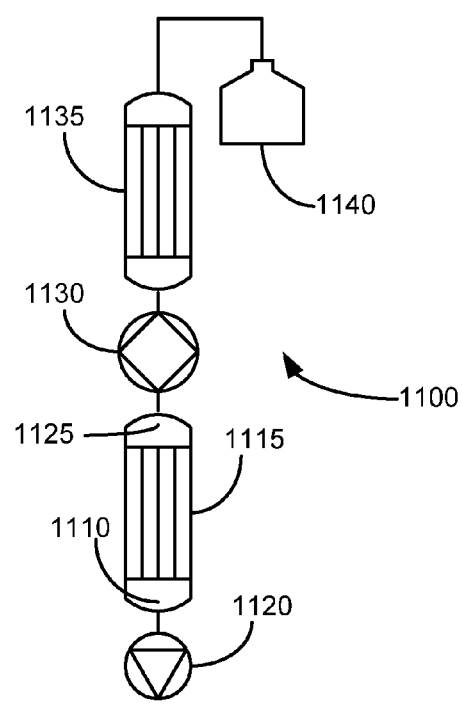
FIG. 11 is a schematic illustration of a sample collection system using a staging pump assembly according to an embodiment of the present disclosure.

In another embodiment, the present disclosure provides a staging pump assembly. The staging pump assembly can be used to allow liquid to be transported a greater lift height than with a single pump. A schematic illustration of an example system 1100 is shown in FIG. 11. The end 1110 of a tubing string 1115, such as a Bennett tubing bundle, is attached to a pump 1120, such as a Bennett pump. A section 1125 of the tubing is coupled to a pump stage assembly 1130. The pump stage assembly 1130 is then connected to the remaining section 1135 of the tubing string 1115, which is connected to a collection unit 1140. Although a single pump stage assembly 1130 is illustrated, multiple pump stage assemblies may be used at various positions in the tubing string 1115 as needed for a particular application.

Figure 12:
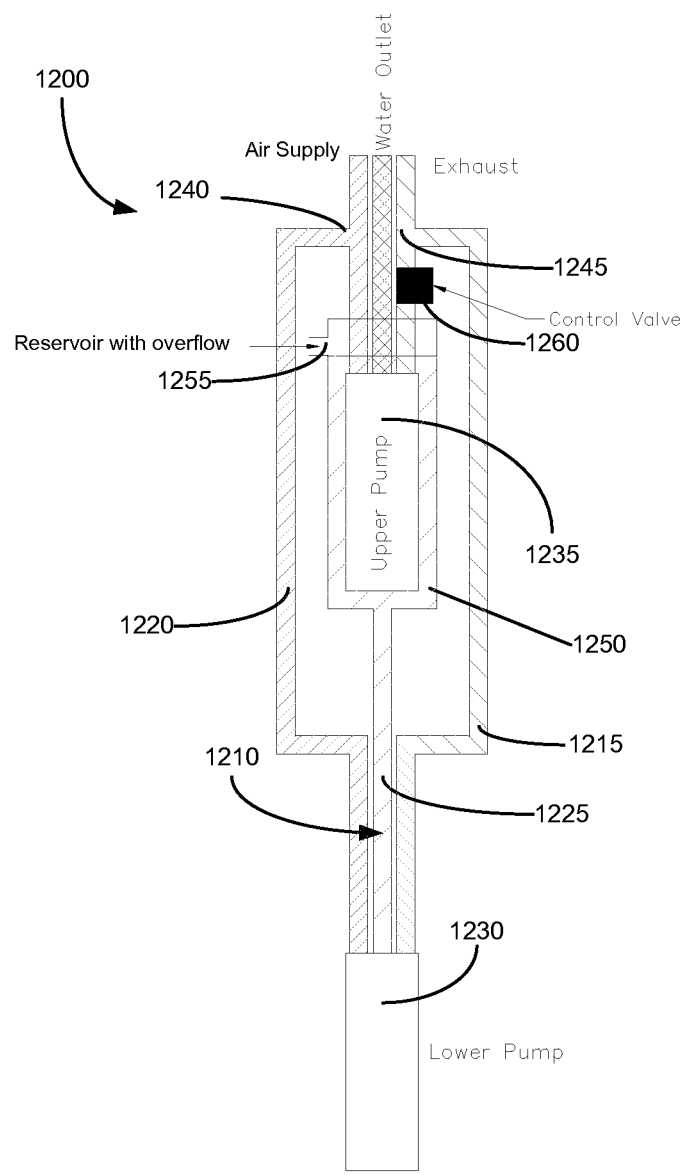
FIG. 12 is a schematic illustration of a sample collection system using a staging pump assembly according to an embodiment of the present disclosure.

FIG. 12 presents a more specific embodiment of a system 1200 for using a pump stage assembly. The system 1200 includes a tubing bundle 1210, such as a Bennett tubing bundle. The tubing bundle 1210 includes an exhaust tube 1215, an air supply tube 1220, and a sample tube 1225. A pump 1230 is coupled to the end of the tubing bundle 1210. In practice, the tubing bundle 1210 may include multiple tubing bundle sections. For example, a first tubing bundle can be used to connect a lower pump to an upper pump and a second tubing bundle can be used to connect the upper pump to the surface.

A staging pump 1235 is coupled to an intermediate portion 1240 of the tubing bundle 1210. The staging pump is housed inside of a pump stage assembly reservoir 1250. The air supply tube 1220 is coupled to a manifold 1240, which couples the air supply tube 1220 to the staging pump 1235. Similarly, the exhaust tube 1215 is coupled to a manifold 1245, which couples the exhaust tube 1215 to the staging pump 1235. The sample tube 1225 is coupled to a reservoir 1250 surrounding at least a portion of the staging pump 1235. In a specific example, the sample tube 1225 is not connected to the inlet port of the upper pump 1235.

In some embodiments, the reservoir 1250 includes an overflow aperture 1255. In other embodiments, the overflow aperture 1255 is omitted. In yet further embodiments, the aperture 1255 is located at the top of the reservoir 1250. The overflow aperture 1255 can serve as a vent for the reservoir. The vent in the reservoir 1250 can reduce or eliminate cavitation in the pump 1235, which could significantly degrade the usefulness of the device.

In other examples, the reservoir 1250 is coupled to a gas source (not shown) for adjusting the level or pressure of gas in the reservoir 1250 as the fluid level in the reservoir varies or as the hydraulic pressure in the lower pump 1230 changes. Maintaining the hydraulic pressure in a sample during lift through tubing can help prevent dissolved gasses from coming out of solution during transport, which can provide a measurement that more accurately reflects the sample composition at the sampling point. Suitable gasses include inert gasses, such as argon. In other example, another method is used to maintain or alter the pressure in the reservoir 1250.

As shown in FIG. 12, a control valve 1260 is coupled to the exhaust tube 1215. The control valve 1260 may be, for example, an orifice plate, a stage controlled solenoid valve, or a stage controlled needle valve. In further embodiments, the control valve 1260 is omitted or is located on a different portion of the system 1200, for example on the air supply tube 1240. In yet further embodiments, the system 1200 includes multiple control valves.

In operation, air or another gaseous fluid is introduced into the air supply tube 1220. The air supply causes the pump 1230 to intake a fluid sample through the sample tube 1225. Air passing through the pump 1230 is returned via the exhaust tube 1215.

The sample taken into the sample tube 1225 passes into the reservoir 1250. Supply air passing through the manifold 1240 causes the staging pump 1235 to pump the sample through the upper sample tube 1225. Air passing through the staging pump 1235 enters the exhaust tube 1215 through the manifold 1245.

The control valve 1260 is used to match the speeds of the pump 1230 and the staging pump 1235. Matching the pump speeds can be used, for example, to prevent or reduce pump cavitation and to adjust the overall pumping rate of the array. Excess sample accumulating in the reservoir 1250 can, in some embodiments, be returned to the environment surrounding the reservoir 1250, such as being discharged into a well in which the tubing bundle 1210 is located.

Figure 13:
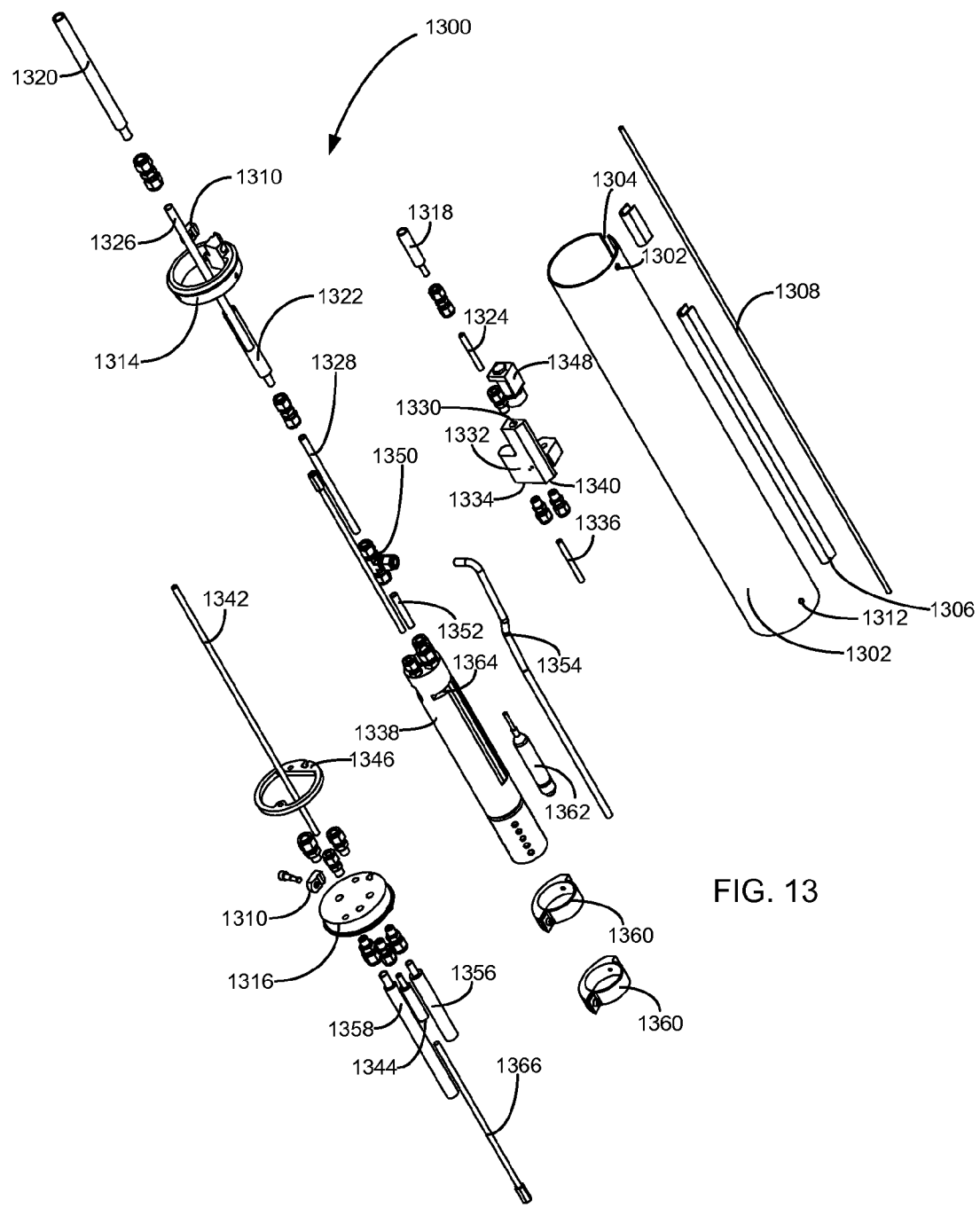
FIG. 13 is an exploded perspective view of a staging pump assembly according to an embodiment of the present disclosure.
Figure 14:
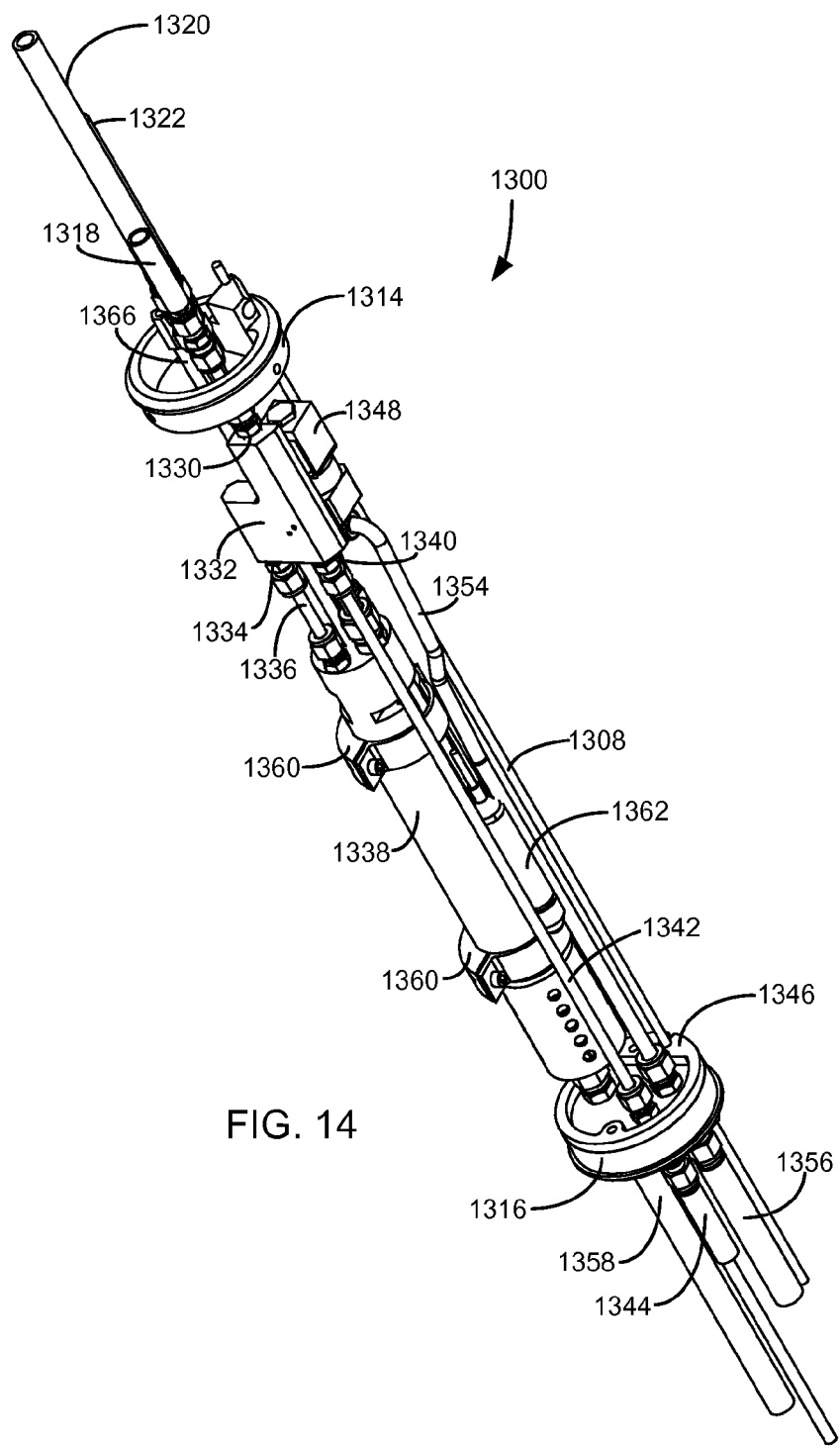
FIG. 14 is a perspective view of the staging pump assembly of FIG. 13.

FIGS. 13 and 14 illustrate exploded views of a staging pump assembly 1300 suitable for use in the systems 700 and 1200. The staging pump assembly 1300 is generally cylindrical and, in use, is surrounded by a housing 1302. The housing 1302 protects internal components and, in some examples, also serves to retain sample material pumped in a reservoir formed by the interior of the housing 1302.

The housing 1302 is generally circular and defines a rectangular aperture 1304 extending axially along the housing surface. A raceway 1306 is insertable into the aperture 1304 and is configured to receive a wireline 1308. The raceway 1306 may be secured to the housing 1302, and optionally the wireline 1308 using shoe clamps 1310. The housing 1302 also defines circular apertures 1312 at each end through which fasteners can be inserted to secure the housing 1302 to upper and lower end caps 1314, 1316.

Fittings serve to couple tubes 1318, 1320, 1322, extending away from staging pump assembly 1300, to corresponding tubes 1324, 1326, 1328 extending into the staging pump assembly 1300. Tubes 1318, 1324 are exhaust tubes. Inner exhaust tube 1318 is coupled to a first port 1330 of a manifold 1332. A second port 1334 of the manifold 1332 is coupled with a fitting to a tubing section 1336 coupled to port on a pump 1338. A third port 1340 of the manifold 1332 is coupled with a fitting to an exhaust bypass tube 1342. The exhaust bypass tube 1342 is coupled with a fitting through the lower end cap 1316 to a fitting and a lower exhaust tube 1344. The lower exhaust tube 1344 is couplable to an air exhaust tube on a Bennett tubing bundle assembly. A gasket 1346 abuts the lower end cap 1316 and can be used to help seal the lower end of the housing 1302 so that fluid does not leak from the staging pump assembly 1300.

The manifold 1332 is coupled to a solenoid 1348. The solenoid 1348 is used to regulate flow between the ports 1330, 1334, 1340 of the manifold 1332. Thus, the solenoid 1348 acts as a control valve, and may be used to regulate the pumping rate of the pump 1338 and in concert with one or more additional pumps located elsewhere on a tubing string that is in fluid communication with the lower exhaust tube 1344. As explained elsewhere in the disclosure, other methods may be used to control the pump speed of the pump 1338 or another pump coupled to a tubing bundle.

Tubes 1320, 1326 are sample tubes. Inner sample tube 1326 is coupled with a fitting to a port on the pump 1338. The tubes 1322, 1328 are air supply tubes. Inner air supply tube 1328 is coupled to a manifold 1352. One outlet of the manifold 1350 is coupled with a tubing section 1352 to a port on the pump 1322. The manifold 1350 also coupled to an air supply bypass tube 1354. The air supply bypass tube 1354 is coupled with a fitting through the lower end cap 1328 and to a lower air supply tube 1356. The lower air supply tube 1356 is connectable to an air supply port of another pump through a Bennett tubing bundle assembly, not shown.

A lower sample tube 1358 is coupled through the lower end cap 1316 with a pair of fittings. Two saddle clamps 1360 are secured to the pump 1338. The saddle clamps 1360 are secured to the housing 1302, such as with a fastener, for example a bolt or a screw. The saddle clamps 1360 thus secure the pump 1338 within the housing 1302.

A pressure transducer 1362 is mounted in a recess 1364 in the side of the pump 1338. The pressure transducer 1362 is typically coupled to a remote computer system and can be used, for example, to determine how much sample is present in the housing 1302, when the housing 1302 functions as a reservoir. In particular implementations, the pressure transducer 1362 is used to help regulate the speed of the pump 1338 by allowing the remote computer system to operate the solenoid 1348 to maintain fluid level as measured by pressure transducer 1362.

Some tubing bundles, such as Bennett tubing bundles, include an internal support structure, such as a steel cable. FIG. 13 illustrates such a cable 1366 extending through the staging pump assembly 1300.

In operation, sample is pumped to the staging pump assembly 1300 through the lower sample tube 1358. In some implementations, the lower sample tube 1358 is directly coupled to the sample inlet of the pump 1338 when using a control mechanism, such as an orifice plate, to control pump air supply or air exhaust rate as described below. In other implementations, the lower sample tube 1358 empties into a reservoir formed by the housing 1302 and the lower end cap 1316, where it can be taken up by a sample inlet of the pump 1338.

Supply air passes through the upper air supply tube 1322, into air supply tube 1328, and into manifold 1350. Manifold 1350 splits the incoming supply air. A portion is directed to the pump 1338 though the tube 1352. Another portion is directed to the lower air supply tube 1356 through air supply bypass tube 1354. Air entering lower air supply tube 1356 may be, for example, directed to a pump located further down the tubing string.

Exhaust air, such as from a pump located further down the tubing string, passes through lower exhaust tube 1344 into the exhaust bypass tube 1342 where it enters manifold 1332. Exhaust from the pump 1338 enters the manifold 1332 through tube 1336. The speed of the pump 1338 relative to a pump located further down a tubing string can be adjusted by controlling the flow of exhaust air through the manifold 1332 using solenoid 1348. The solenoid 1348 is typically used to match the pump speeds to help prevent pump cavitation. When more than two pumps are used, a multiconductor cable can be used to control, such as independently control, each pump, such as using a solenoid for each pump.

Sample output by the pump 1338 enters sample tubes 1320, 1326, where it can be carried to a collection point or to another staging pump assembly.

The staging pump assembly can be operated in a number of ways. In one example, the staging pump assembly is used for aquifer testing with a constant pumping rate. In this example, the pump flow rate can be computer controlled. In another example, the staging pump assembly is used for tracer testing with a constant pumping rate. In addition to the computer controlled pumping rate, geophysical instrumentation below the pump is controlled by the wireline. A number of parameters can be monitored using this method, including water level, pH, temperature, dissolved oxygen, electrical conductivity, oxidation-reduction potential, and/or specific ions, such as using ion-specific electrodes. In another example, the staging pump assembly is used for geochemical sample collection. In this example, the pump flow rate may be controlled using pre-selected exhaust port orifice disks. The diameter of the orifice controls the exhaust flow rate, thereby controlling water flow rate.

One consideration in operating the staging pump is matching its flow rate with that of a pump located further down the tubing string. Although a number of methods can be used to accomplish flow rate matching, three methods are described below.

Matching the flow rates of the two pumps can be accomplished mechanically, assuming that the lift requirements do not change for either pump during operation. The pump performance characteristics can be quantified for various pump and tubing systems. From these pump performance characteristics, the staging pump rate can be adjusted to match the flow rate of a lower pump. In this example, the staging pump can be adjusted at the surface prior to pump and tubing bundle installation. This adjustment can include, for example, installing an exhaust port restriction orifice to increase back-pressure on the airmotor, thereby decreasing the power output of the motor, which in turn results in a decrease in pump flowrate and lift height capability. The installation of the orifice plate in the exhaust port has the effect of increasing the effective lift height of the staging pump, without affecting the performance of the lowermost pump. Since both pumps exhaust their respective airmotor air into a common exhaust line, it may be difficult to install this orifice at the surface without affecting both pumps. This approach is simple from both a design and use standpoint, relatively easy to invoke, and field adjustable and repairable. However, this approach may not produce a constant flow rate if the water table is expected to decline with time during pumping.

Matching the flow rates of the two pumps can be accomplished with computer control. In one embodiment, this is accomplished by installing a pressure transducer in the staging pump reservoir for the purpose of measuring reservoir water levels. This transducer may be wired into a multi-conductor cable that is integrated into a tubing bundle or a wireline. In addition, an electrical solenoid valve is plumbed into the air supply line to the second-stage pump and wired into the multi-conductor cable. At the surface, a computer or datalogger monitors the water level in the reservoir and controls the air supply to the second-stage pump motor to maintain reservoir water levels between high and low setpoints. However, this approach can produce sporadic or 'spurting' flow at the surface and includes the added complication of computer control.

Another approach to computer control of the staging pump is to incorporate a variable aperture, numerically controlled valve in the air supply line. This valve is capable of adjusting air flow to the pump with a better resolution than the solenoid valve approach described above. Coupling this valve together with a water-level pressure transducer in the pump reservoir allow a controlling computer to optimize the flow rate of the staging pump and provide a constant stage in the pump reservoir. As a consequence, the flow rate of the staging pump can be adjusted to match that of a lower pump. In addition, if constant flow from the lower pump is required, the variable aperture valve can be installed on the air supply line to the lower pump. Control of the lower pump can be achieved until the lift head on the pump reaches the desired level.

It is to be understood that the above discussion provides a detailed description of various embodiments. The above descriptions will enable those of ordinary skill in the art to make and use the disclosed embodiments, and to make departures from the particular examples described above to provide embodiments of the methods and apparatuses constructed in accordance with the present disclosure. The embodiments are illustrative, and not intended to limit the scope of the present disclosure. The scope of the present disclosure is rather to be determined by the scope of the claims as issued and equivalents thereto.

We claim:

1. A sampling method comprising, in a downhole environment:
    obtaining a fluid sample;
    pumping the fluid sample from a first positive displacement pump to a reservoir operatively coupled to a positive displacement staging pump, the reservoir being open to the atmosphere;
    pumping the fluid sample from the reservoir with the staging pump to a collection vessel; and
    controlling the flow rates of the first positive displacement pump and the positive displacement staging pump to avoid cavitation of the positive displacement staging pump.

2. The sampling method of claim 1, wherein the positive displacement staging pump and reservoir are part of a staging pump assembly, the staging pump assembly comprising a housing surrounding the positive displacement staging pump and the reservoir.

3. The sampling method of claim 1, further comprising coupling the positive displacement staging pump to upstream air supply and exhaust tubes and downstream air supply and air exhaust tubes.

4. The sampling method of claim 3, wherein coupling the positive displacement staging pump to upstream air supply and exhaust tubes and downstream air supply and air exhaust tubes comprises coupling the air supply and exhaust tubes to manifolds coupled to the positive displacement staging pump.

5. The sampling method of claim 1, wherein the positive displacement staging pump is coupled to an upstream tubing bundle and a downstream tubing bundle.

6. The sampling method of claim 5, further comprising deploying a wireline proximate the upstream and downstream tubing bundles while coupling the wireline to the upstream and downstream tubing bundles.

7. The sampling method of claim 6, wherein coupling the wireline to the upstream and downstream tubing bundles comprises attaching the wireline to the tubing bundles with clamps at a plurality of points along the length of the upstream and downstream tubing bundles.

8. A pump assembly comprising:
    a staging pump assembly comprising:
        a housing, the housing defining a reservoir open to the atmosphere;
        a first positive displacement pump having an air supply inlet, an exhaust air outlet, a sample inlet, and a sample outlet;
        an air supply manifold coupled to the air supply inlet of the first positive displacement pump;
        an exhaust air manifold coupled to the exhaust air outlet of the first positive displacement pump;
    an upstream pump assembly comprising a second positive displacement pump having a pump inlet and a pump outlet, the pump outlet coupled to the sample inlet of the first positive displacement pump; and
    a computing device coupled to the first positive displacement pump and the second positive displacement pump and programmed to synchronize the pump rates of the first displacement pump and the second displacement pump in order to avoid cavitation in the first displacement pump.

9. The pump assembly of claim 8, further comprising a control valve coupled to the air exhaust manifold.

10. The pump assembly of claim 8, further comprising an exhaust bypass tube coupled to the exhaust air manifold.

11. The pump assembly of claim 8, further comprising an air supply bypass tube coupled to the air supply manifold.

12. The pump assembly of claim 8, wherein the sample inlet is in fluid communication with the interior of the housing.

13. A sample collection system comprising:
the pump assembly of claim 8;
an upper tubing bundle;
a lower tubing bundle;
a wireline; and
a plurality of clamps coupled to the upper tubing bundle and the wireline.

14. The sample collection system of claim 13, further comprising a plurality of clamps coupled to the lower tubing bundle and the wireline.

15. The sample collection system of claim 13, wherein the upper and lower tubing bundles each comprise an air supply tube, an exhaust air tube, and a sample tube, the air supply tubes coupled to the air supply manifold of the staging pump assembly, the exhaust air tubes coupled to the exhaust air manifold of the staging pump assembly, and the sample tube of the upper tubing bundle coupled to the sample outlet of the first positive displacement pump.

16. The sample collection system of claim 15, wherein the sample tube of the lower tubing bundle is fluidly coupled to the sample inlet of the first positive displacement pump.

17. The sample collection system of claim 15, wherein the sample tube of the lower tubing bundle is fluidly coupled to a reservoir formed by the housing of the staging pump assembly, the reservoir fluidly coupled to the sample inlet of the first positive displacement pump.

\* \* \* \* \*